US012646178B2

(12) United States Patent
Gueth et al.

(10) Patent No.: US 12,646,178 B2
(45) Date of Patent: Jun. 2, 2026

(54) MODELING SHAPES USING SIGNED DISTANCE FUNCTION APPROXIMATION

(71) Applicant: Adobe Inc., San Jose, CA (US)

(72) Inventors: Pierre Gueth, Lyons (FR); Jeremy Levallois, Lyons (FR); Alexandros Keros, London (GB)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 18/391,019

(22) Filed: Dec. 20, 2023

(65) Prior Publication Data

US 2025/0209633 A1      Jun. 26, 2025

(51) Int. Cl.
| | |
|---|---|
| *G06T 7/12* | (2017.01) |
| *G06T 15/06* | (2011.01) |
| *G06T 15/08* | (2011.01) |
| *G06T 17/00* | (2006.01) |
| *G06T 17/20* | (2006.01) |

(52) U.S. Cl.
CPC ............... *G06T 7/12* (2017.01); *G06T 15/06* (2013.01); *G06T 15/08* (2013.01); *G06T 17/005* (2013.01); *G06T 17/20* (2013.01); *G06T 2207/20021* (2013.01); *G06T 2210/12* (2013.01)

(58) Field of Classification Search
None
See application file for complete search history.

(56) References Cited

U.S. PATENT DOCUMENTS

2025/0182377 A1*    6/2025   Kensler ................... G06T 15/06

OTHER PUBLICATIONS

Masuda, Filling the signed distance field by fitting local quadrics, Proceedings. 2nd International Symposium on 3D Data Processing, Visualization and Transmission, 2004. 3DPVT 2004. (2004, pp. 1003-1010 (Year: 2004).*
Wong, Ray Marching and Signed Distance Functions, archive.org, https://web.archive.org/web/20231123181117/http:/jamie-wong.com/2016/07/15/ray-marching-signed-distance-functions/ (Year: 2023).*
Wikipedia, Ray Marching, https://web.archive.org/web/20230323182241/https://en.wikipedia.org/wiki/Ray_marching, hereinafter "Wikipedia") (Year: 2023).*

(Continued)

*Primary Examiner* — Kee M Tung
*Assistant Examiner* — Biao Chen
(74) *Attorney, Agent, or Firm* — Kilpatrick Townsend & Stockton LLP

(57)                    ABSTRACT

Certain aspects and features of this disclosure relate to modeling shapes using SDF approximation. For example, a method involves partitioning a surface-bounding volume configured to contain the surface of a shape using a volumetric grid. The method also involves approximating, using a basis function, a value of a signed distance function (SDF) for samples taken inside, and on a boundary of, each surface-containing cell of the grid, and storing, based on the sign changes, coordinates for each of the cells. The method further involves constructing a surface-bounding volume hierarchy for the shape by assigning bounding volumes to each of the cells based on the coordinates. The method additionally involves determining an intersection of a ray with each surface-bounding volume in the surface-bounding volume hierarchy and rendering or storing a representation of the shape based on each intersection.

17 Claims, 8 Drawing Sheets

(56) References Cited

OTHER PUBLICATIONS

Karras, Tero, "Maximizing Parallelism in the Construction of BVHs, Octrees, and K-D Trees", In Proceedings of the Fourth ACM SIGGRAPH/Eurographics conference on High-Performance Graphics, 2012, pp. 33-37.

Solomon, Justin, et al., "Earth Mover's Distances on Discrete Surfaces", ACM Transactions on Graphics (ToG) 33, No. 4. 2014, 12 pages.

Frisken, Sarah F., et al., "Adaptively Sampled Distance Fields: A General Representation of Shape for Computer Graphics", In Proceedings of the $27^{th}$ Annual Conference on Computer Graphics And Interactive Techniques, 2000, pp. 249-254.

Takikawa. Towaki, et al., "Neural Geometric Level of Detail: Real-Time Rendering with Implicit 3D Shapes", In Proceedings of the IEEE/CVF Conference on Computer Vision and Pattern Recognition, 2021, pp. 11358-11367.

Carr, Jonathan C., et al., "Reconstruction and Representation of 3D Objects with Radial Basis Functions", In Proceedings of the 28th Annual Conference on Computer Graphics and Interactive Techniques, 2001, 10 pages.

* cited by examiner

Computing Device

101

3D Modeling Application 102

Shape Definition 112

Surface-bounding Volume

111

120

116 Cell Coordinates

BVH

118

SDF Values 122

Basis Function

Ray Definitions 126

Volumetric Grid 124

130

Interface Module

132

136

Rendered Shape

Resolution Input

Network 104

Input Device 140

Presentation Device 108

100

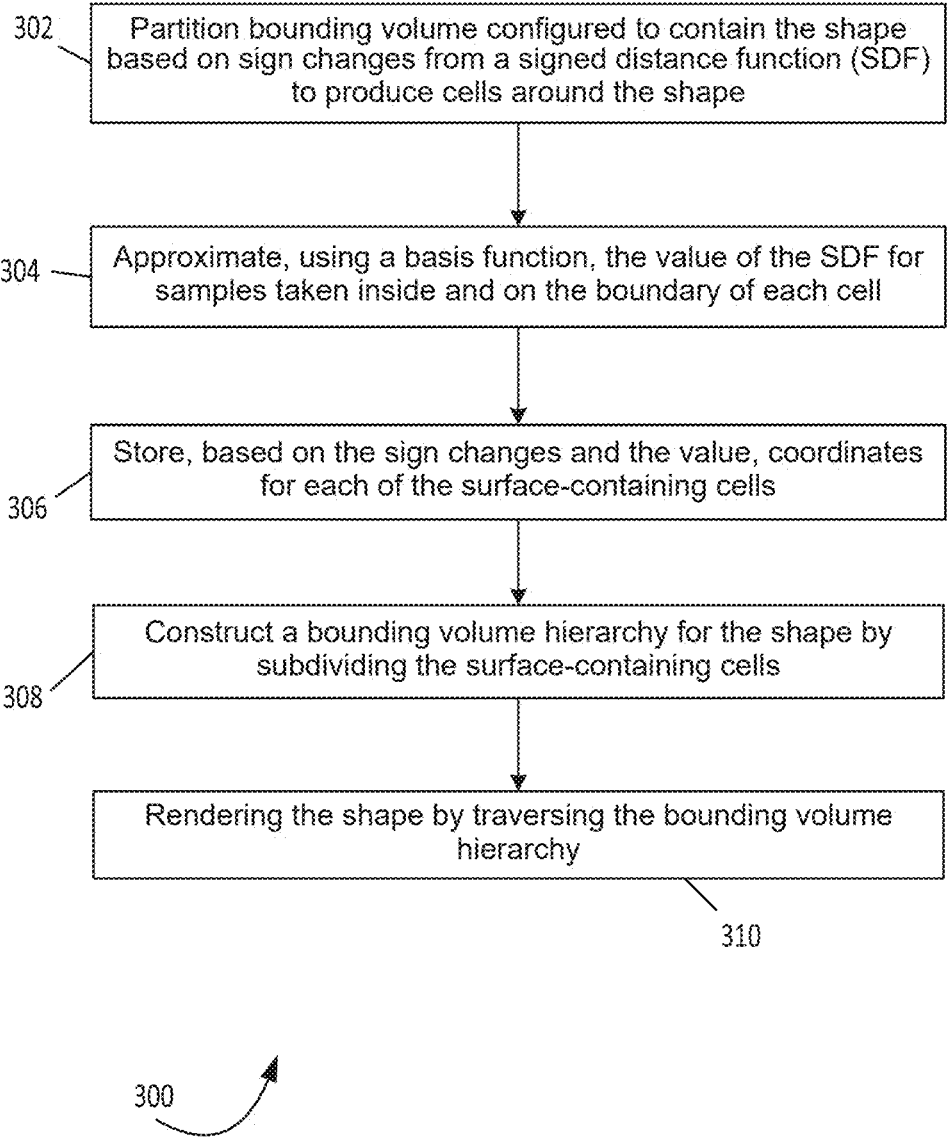

302 — Partition bounding volume configured to contain the shape based on sign changes from a signed distance function (SDF) to produce cells around the shape 304 — Approximate, using a basis function, the value of the SDF for samples taken inside and on the boundary of each cell 306 — Store, based on the sign changes and the value, coordinates for each of the surface-containing cells 308 — Construct a bounding volume hierarchy for the shape by subdividing the surface-containing cells Rendering the shape by traversing the bounding volume hierarchy

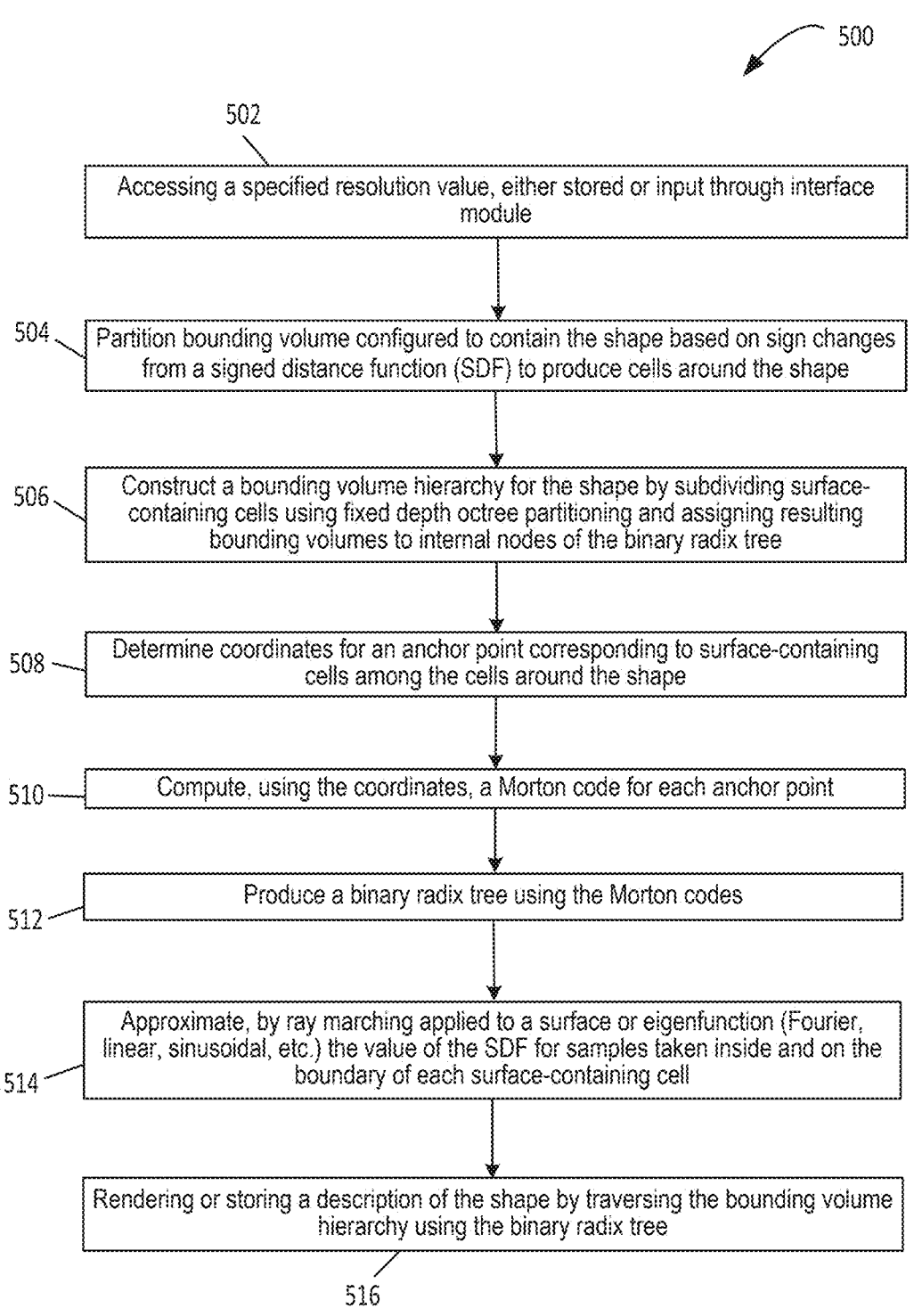

500

502

Accessing a specified resolution value, either stored or input through interface module

504

Partition bounding volume configured to contain the shape based on sign changes from a signed distance function (SDF) to produce cells around the shape

506

Construct a bounding volume hierarchy for the shape by subdividing surface-containing cells using fixed depth octree partitioning and assigning resulting bounding volumes to internal nodes of the binary radix tree

508

Determine coordinates for an anchor point corresponding to surface-containing cells among the cells around the shape

510

Compute, using the coordinates, a Morton code for each anchor point

512

Produce a binary radix tree using the Morton codes

514

Approximate, by ray marching applied to a surface or eigenfunction (Fourier, linear, sinusoidal, etc.) the value of the SDF for samples taken inside and on the boundary of each surface-containing cell Rendering or storing a description of the shape by traversing the bounding volume hierarchy using the binary radix tree

MODELING SHAPES USING SIGNED DISTANCE FUNCTION APPROXIMATION

TECHNICAL FIELD

The present disclosure generally relates to three-dimensional (3D) computer modeling. More specifically, but not by way of limitation, the present disclosure relates to techniques for rendering a 3D model of an object using a signed distance function (SDF) while applying an approximation technique to reduce rendering time.

BACKGROUND 3D modeling software applications are used in a number of different fields. For example, such applications may be used to create models of actual objects to be manufactured. The models can in turn be used to produce production drawings or computer files to control manufacturing equipment. 3D modeling software may also be used to create and render realistic 3D shapes of products for marketing purposes. 3D modeling may also be employed to render realistic objects for placement in images for video games, television programs, movies, training simulators, or virtual reality attractions at amusement parks. Some rendering engines for 3D modeling use SDFs to render compact 3D model representations with relatively high resolution.

SUMMARY

Certain aspects and features of the present disclosure relate to modeling shapes using SDF approximation. For example, a method involves partitioning a bounding volume configured to contain a shape based on sign changes from a signed distance function (SDF) to produce cells around the shape, including surface-containing cells. The method also involves approximating, using a basis function, a value of the SDF for samples taken inside and on a boundary of each surface-containing cell. The method further involves storing, based on the sign changes and the value, coordinates for each of the surface-containing cells. The method additionally involves constructing a bounding volume hierarchy for the shape by assigning bounding volumes to each of the surface-containing cells based on the coordinates and rendering the shape by traversing the bounding volume hierarchy.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where:

FIG. 3 is a flowchart of an example of a process for modeling a shape using SDF approximation, according to some embodiments.

FIG. 5 is a flowchart of another example of a process for modeling shapes using SDF approximation, according to some embodiments.

Figure 1:
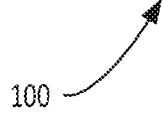
FIG. 1 is a diagram showing an example of a computing environment for modeling shapes using SDF approximation, according to certain embodiments.

DETAILED DESCRIPTION 3D modeling software applications may be used to create models of actual objects to be manufactured. The models can in turn be used to produce production drawings or computer files to control manufacturing equipment or for rendering realistic objects for placement in images for video games, television programs, movies, training simulators, or virtual reality attractions at amusement parks, just to name a few examples. Some software uses meshes that are combinatorial representations, resulting in high computer storage requirements. Some software uses SDFs to render compact 3D model representations with relatively high memory efficiency and resolution. However, rendering performance can be compromised by the complexity of SDFs.

In addition to being resource intensive, existing 3D modeling applications that make use of meshes may require extensive manual adjustment of modeling parameters to make changes between renders. A high degree of expertise may be required to adjust modeling parameters appropriately and efficiently to achieve desired results. Extensive trial and error is often required because many of the modeling parameters interact with each other and the editing process may therefore be slow. With SDF-based solutions, the repeated evaluations necessary for each pixel in order to render the object result in a strong correlation between rendering time and complexity of the model being produced. As the complexity of the model increases, the rendering time and corresponding waiting will increase accordingly. This dependence again results in a slower workflow, at least for complex shapes.

Aspects and features of the present disclosure provide 3D modeling software that uses hierarchical decomposition for SDF approximation to improve rendering time when working with complex shapes. The decomposition is based on a volume hierarchy that subdivides the surface of interest into manageable partitions, or cells. These cells can be sufficiently approximated with straightforward basis functions, for example, functions from the family of eigenfunctions in the ambient domain. The ambient domain for a given portion of the surface may be, as an example, one of the cubical cells into which the surface of interest has been partitioned.

For example, a 3D modeling application can be used by a graphics designer to create, edit, and render 3D objects. An object can be rendered for display and evaluation, or for being output to a storage device in a format that is customized for ease of some particular use of the image. When a designer provides input to the software to trigger rendering, a bounding volume for the design is established by the 3D modeling application. The bounding volume is configured to contain the surface of the shape to be rendered, and a volumetric grid is used by the modeling application to decompose the bounding volume using sign changes from an SDF and produce cells. The application approximates, using a basis function, a value of the SDF for sample points taken inside, and on a boundary of, each cell to reduce the cells to only surface-containing cells. The application can use the sign changes and values to store coordinates for each of the surface-containing cells.

Once the surface-containing cells are identified by the application, the application programmatically constructs a bounding volume hierarchy (BVH) for the shape by assigning bounding volumes to each of the surface-containing cells based on the coordinates. The BVH is a subset of the initial (regular) volumetric grid. Parts of the volumetric grid that don't contain the surface are ignored in order to reduce the number of cells of the grid. The application then determines, for example, using a ray marching algorithm, how a ray recursively traverses the bounding volume hierarchy. The shape can be rendered based on the ray traversal. A specified resolution value can be used by the 3D modeling application to produce the volumetric grid. This value can be adjusted to balance resolution and rendering time taking into account the anticipated use of a given rendered image.

In some examples the coordinates for cells include coordinates for an anchor point corresponding to each of the cells. A binary radix tree using the coordinates of the anchor points can be produced. The BVH can be constructed using fixed depth octree partitioning. The BVH for the shape being modeled can be provided by assigning the bounding volumes to internal nodes of the binary radix tree. A Morton code can be computed for each anchor point and the binary radix tree can be produced using the Morton codes.

Examples of functions that can be used for a basis function for approximation include a Fourier function, a flat approximation, a constant value, a linear function, and a sinusoidal function. Two or more of these functions can be combined or used together. The use of an approximation based on a basis function to precompute a structure speeds up the ray marching used for rendering. Further, the approximation can be carried out after decomposing the shape to be rendered into smaller, local cells or domains. These techniques combine to reduce rendering times, improving the speed and efficiency of a workflow by allowing more changes to be applied and evaluated for a given 3D model in a given amount of time.

FIG. 1 is a diagram showing an example of a computing environment 100 that provides for modeling shapes using SDF approximation according to certain embodiments. The computing environment 100 includes a computing device 101 that executes a 3D modeling application 102, a presentation device 108 that is controlled based on the 3D modeling application 102, and input device 140 that receives input commands, which may include selections from a graphical user interface that causes the 3D modeling application 102 to produce a 3D design and store or render the 3D design. Such a 3D modeling application may provide functions including painting, designing, material transfer, and working with surface textures. The computing devices 101 can be communicatively coupled to other computing devices (not shown) using network 104. Other computing devices may include virtual or physical servers where vector graphical designs may be stored, or where updates to the 3D modeling application may be stored and distributed to computing devices 101.

In this example, the 3D modeling application 102 includes a stored bounding volume 111, which may encompass a shape defined by stored shape definition 112. 3D modeling application 102 in this example also includes cell coordinates 116 for the cells into which the processor is configured to partition the bounding volume 111, forming the volumetric grid 124. Basis function 118 can be used to approximate SDF values 122 for samples taken inside and on the boundary of each cell of BVH 120. Computing device 101, under the control of the 3D modeling application 102 constructs the BVH 120. Rays using ray definitions 126 are computationally produced and intersection with BVH 120 are used to render/visualize the 3D shape. The shape can be rendered, or the definition can be stored for rendering later or for other purposes.

In the example of FIG. 1, 3D modeling application 102 also includes an interface module 130. In some embodiments, 3D modeling application 102 can produce a rendered shape 132 corresponding to the 3D shape defined by the intersection of rays produced by ray definitions 126 with the volumes in BVH 120. In some embodiments, the 3D modeling application 102 uses an input device 140, for example, a keyboard, mouse, or trackpad, to receive resolution input 136 corresponding a selected resolution for defining the volumetric grid 124, which in turn controls the resolution of the BVH 120 and the overall resolution of the rendered 3D shape. Lower resolution results in faster renderings, depending on the basis function used, since computational cost or rendering is reduced. Higher resolution provides for rendered shapes with a finer and more realistic appearance. As previously mentioned, input device 140 can also be used to receive input directed to producing a 3D design and storing or rendering the 3D design.

Figure 2:
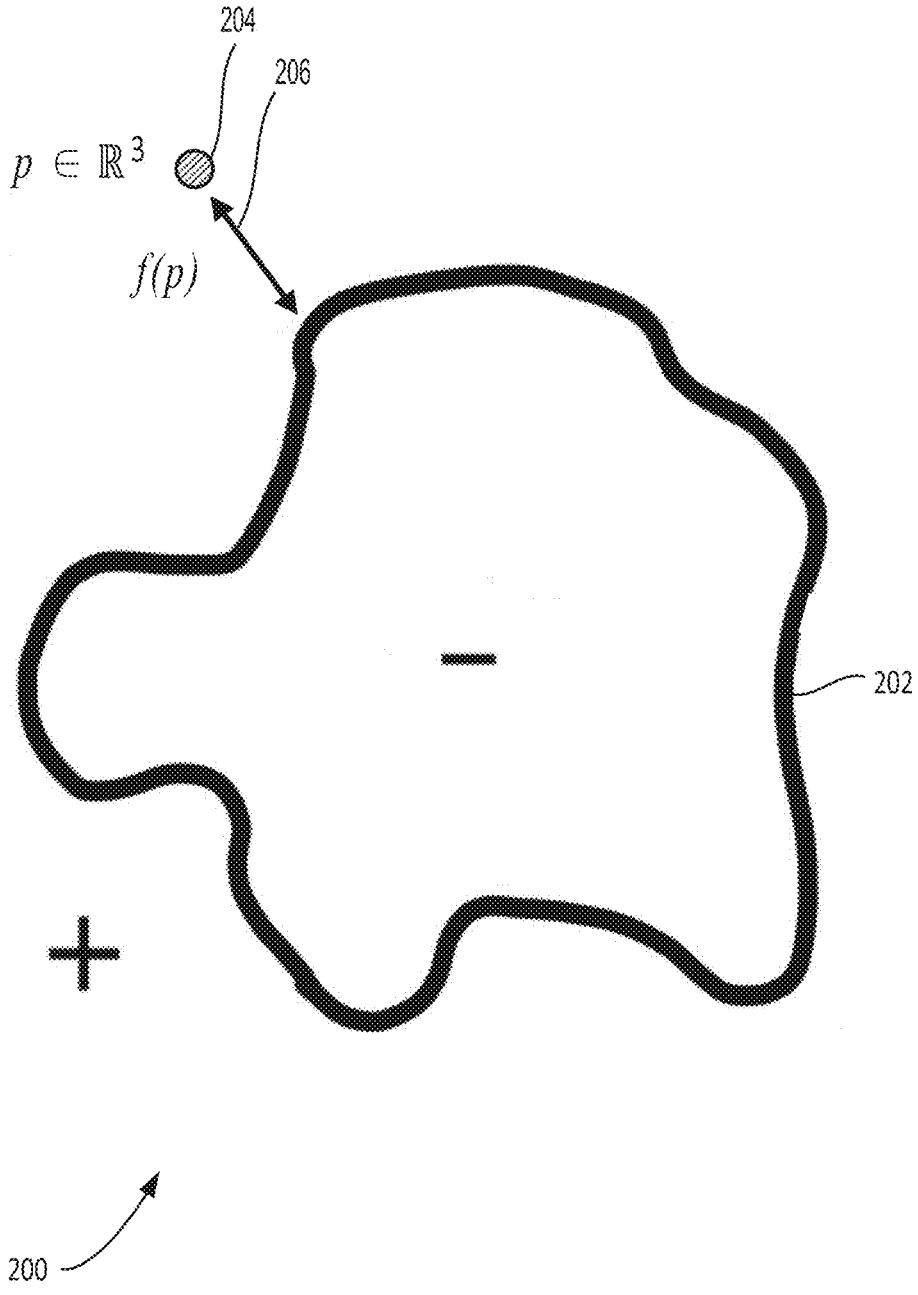
FIG. 2 is a diagram of an example of an implicit surface function used in modeling shapes using SDF approximation, according to certain embodiments.

FIG. 2 is a diagram of an example 200 of an implicit surface function used in modeling shapes using SDF approximation, according to certain embodiments. An implicit surface function defines an implicit surface, for example, implicit surface 202. The implicit surface is defined using a continuous scalar function defined at each point in the space. Compared to a function that defines a surface with finite sets of vertices and facets, the resolution of an implicit surface can be higher. However, a discrete surface is less complex to render, map, and parameterize, so a discrete function is often used in imaging even though storing such a function generally requires a high memory footprint. Modelling based on an implicit surface benefits from theoretically infinite resolution and high memory efficiency, due to the compact analytic representation an implicit surface offers. The functional representation that implicit surfaces provide may allow for smooth parametric manipulation of models without the need for cumbersome face and vertex handling, and without the threats of meshing artefacts appearing and/or memory requirements becoming unmanageable.

Repeated implicit surface evaluations that, without approximation, would be necessary for each pixel, can provide a strong correlation between rendering time and complexity of the model. As the complexity of the model in terms of implicit surface evaluation cost increases, the rendering time will increase accordingly. This dependence motivates a need for the approximation technique that exchanges repeated evaluations of implicit surfaces by more computationally efficient calculations, while sufficiently approximating the surface of interest for aesthetic purposes.

Using approximation can eliminate or minimize the disadvantages of an implicit surface function while maintaining some of the advantages of its use, such as the smaller memory footprint. In FIG. 2, the implicit function $f$ has a scalar value for each point p. When p lies on implicit surface 202: $f(p)=0$. When p is inside surface 202, the surface of the SDF, indicated by the minus sign in FIG. 2.: $f(p)<0$. When p lies outside surface 202, indicated by the plus sign in FIG. 2: $f(p)>0$. Thus, in example embodiments, sign changes in the value of the SDF, are used to determine whether a value is inside, outside, or on the boundary of a cell. When $f(p)$ is positive, the larger the value, the further outside the surface point p is located. Thus:

$$p\in\mathbb{R}^2,$$

for a 2D SDF, while:

$$p\in\mathbb{R}^3,$$

for a 3D SDF. The latter is shown in FIG. 2 because the figure is a 2D slide of the 3D space, for clarity of the value variation inside and outside the example torus. For example, the value of $f(p)$ at point 204 is represented by distance 206.

The implicit basis function can be evaluated using a ray marching algorithm. In ray marching, given a starting position and a direction, the function $f(p)$ is repeatedly evaluated. In some examples, the function is evaluated hundreds of times per ray to find values that move closer and closer to the implicit surface. The time it takes to compute the function $f(p)$ has a direct impact on the overall rendering time of the shape. In example embodiments, the computing device spatially decomposes the function $f(p)$ hierarchically. The SDF is then approximated on a local basis. The approximation is used during ray marching or sphere marching to improve rendering performance. Sphere marching is one method of ray marching.

Ray marching can be used to find the intersection between a ray traveling from the camera to the surface, by performing fixed steps, and reducing the ray (traveling backward) when it intersects the surface to find the closest point of intersection. Sphere tracing takes into account the existence of a distance field, meaning for each point, the distance to the closest point of the surface is known. The ray can be moved iteratively depending to this distance, and the distance can be updated.

FIG. 3 is a flowchart of an example of a process 300 for modeling shapes using SDF approximation, according to some embodiments. In this example, a computing device carries out the process by executing suitable program code, for example, computer program code executable to provide 3D graphics function such as 3D modeling application 102. At block 302, the computing device running the 3D modeling application computationally partitions a bounding volume such as surface-bounding volume 111. The bounding volume is configured based on sign changes from a signed distance function (SDF) to contain the surface of the shape to be rendered by using the volumetric grid 124 to produce cells around the shape. In this example, the volumetric grid is a cubical grid. At block 304, the computing device can approximate the SDF values 122 of the signed distance function (SDF) for samples taken inside and on the boundary of each cell where the surface of the shape is present. This approximation uses a basis function, which can be selected from among various basis functions. For example, an implicit surface can be used as a basis function.

An implicit surface can provide a compact representation with higher resolution and high memory efficiency. Implicit surfaces will be discussed in further detail below. While it is possible to make the selection of a basis function via input to an interface device, as will be discussed later, the best selection may depend on factors that a user is unaware of or is otherwise not likely to change. Thus, the specific basis function can be programmatically set as part of the 3D modeling application. Alternatively, the 3D modeling application can programmatically determine the best basis function after a shape is input. In some embodiments, this optimal choice may also be affected by the available computing hardware, for example, the availability of a graphics processing unit (GPU) and the type and computational power of the GPU. For example, a high-end GPU may have more bandwidth available between each operation of the rendering process, making it more computationally affordable to transmit more information between components at each operation.

Staying with FIG. 3, at block 306, the computing device stores coordinates 116 for each of the surface-containing cells. The surface presence is programmatically detected using the sign changes. At block 308, the computing device constructs the BVH for the shape by subdividing the cells in which the surface is present (the surface-containing cells). At block 310, the computing device traverses the BVH 120 to determine the surface of the shape in order to render or store the shape. The shape may be rendered on presentation device 108. It is also possible for the computing device to store a file with a computational definition of the shape that lends itself to efficient rendering. Such a stored file can then be used for rendering, either substantially contemporaneously or in the future. In some embodiments, the operations needed to produce a grid of cells, build bounding volumes, and carry out the SDF and approximation functions described herein can be part of a rendering engine included with the 3D modeling application 102.

The process described in the present disclosure subdivides the domain into cells and determines cell occupancy, and computationally builds the BVH. Morton codes can be used to provide even more computational efficiency while still capturing surface details. They provide a compact representation of coordinates and can be precomputed for all rays. Morton codes take a binary representation of a point by its xyz coordinates in space and convert the representation into a single binary number. The conversion is accomplished by creating interlace digits in xyz order until the last digit of the coordinate for one axis, in this example, the z axis. This process creates a single number. Morton codes are binary representations of points in space, based on the ordering of said points along a space-filling curve. A Morton code is a computationally efficient BVH implementation. Each bounding box of the BVH can be defined using a Morton code so that a sequence of Morton codes can be used to evaluate each surface-bounding volume one after another.

The Morton code is an efficient way to implement a BVH. In some examples, the entire sequence of all volumes in the BVH can be stored for traversal, encoding each volume as an integer in 3D for bitwise operations. This efficient implementation of the BVH allows the volumes in the hierarchy to be traversed by computationally generated rays very quickly, improving the time to process each frame. Morton codes can be computed for an anchor point within each cell of the volumetric grid, and these Morton codes can be used to define a binary radix tree. The BVH can be produced by assigning each surface-bounding volume to an internal node of the tree.

Figure 4:
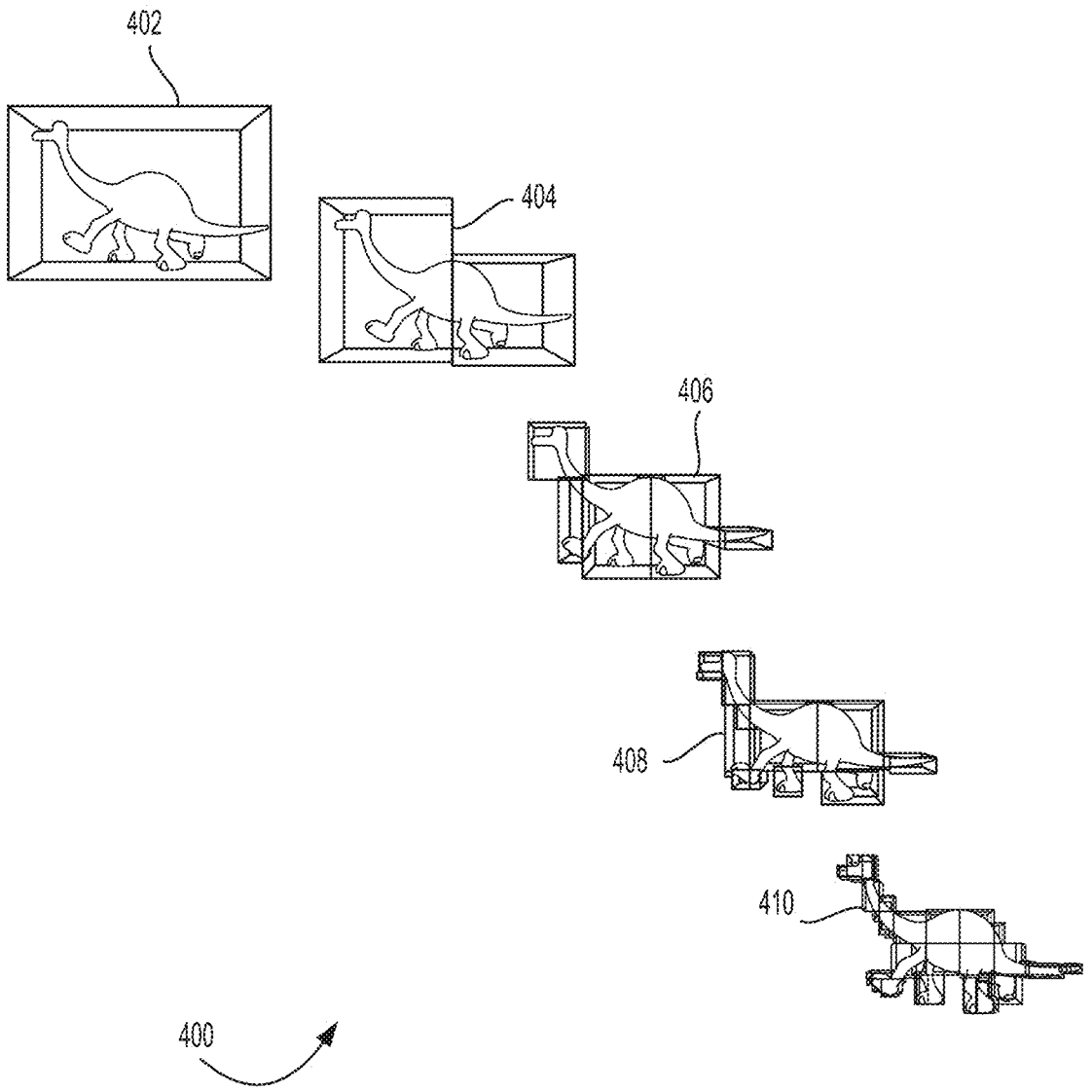
FIG. 4 is a diagram of an example of bounding box hierarchy used in modeling shapes using SDF approximation, according to certain embodiments.

FIG. 4 is a diagram of an example of bounding box hierarchy 400 used in modeling shapes using SDF approximation, according to certain embodiments. For purposes of this example, the surface being evaluated for rendering is that of a dinosaur figure. The hierarchy begins with a single bounding box 402. This bounding box is divided into two bounding boxes 404. Increasingly granular bounding boxes are formed within the space represented by the previous bounding boxes, with bounding box hierarchy 410 being more granular (more tightly coupled to the surface with possibly more bounding boxes) than bounding box hierarchy 408, which is more granular than bounding box hierarchy 406, which is formed by dividing the bounding boxes in bounding box hierarchy 404. An error function can be used to determine a threshold that determines the final BVH granularity.

A BVH is a hierarchical decomposition of the object's surface. For each small, local bounding volume, the computing device can do an approximation of the basis function using algebraic tools. Multiple approximations can be computed. In some embodiments, the 3D modeling application can determine which approximation is best for use in a rendering given parameters of resolution and speed that have been set. Once the BVH is computed to the precision required by these parameters, the SDF or implicit function can be projected on the basis functions in each leaf of the binary radix tree by sampling the basis function to build an approximation of the function. The more basis elements added to the approximation, the closer the approximation will be to the original surface. The compromise between precision and computational weight can be controlled, either by hard-coding or by providing for user input parameters for the process, for example, using input device 140. In some embodiments, all computations required by a ray marching algorithm can share the same BVH, for example, BVH 410.

FIG. 5 is a flowchart of another example of a process 500 for modeling shapes using SDF approximation, according to some embodiments. In this example, a computing device carries out the process by executing suitable program code, for example, computer program code for an application such as 3D modeling application 102. At block 502, the computing device accesses a specified resolution value, either stored or input through a user interface, for example, using input device 140. At block 504, the computing device partitions a bounding volume configured to contain the shape using sign changes from the SDF to produce cells around the shape. In this example, the bounding volume is partitioned using a volumetric grid to produce cubical cells around the surface.

Staying with FIG. 5, at block 506, the computing device constructs a BVH for the shape by using fixed depth octree partitioning and assigning bounding volumes that contain the surface (i.e., have a sign change of the implicit function) to internal nodes of the binary radix tree. The functions included in blocks 502-506 and discussed with respect to FIG. 5 can be used in implementing a step for approximating a value of a signed distance function (SDF) for each cell of the plurality of cells of a bounding volume configured to contain a surface of a shape.

Continuing with FIG. 5, at block 508, the computing device determines coordinates for an anchor point corresponding to each cell. These anchor point coordinates can be treated as the approximate cell coordinates. At block 510, a Morton code is computed for each anchor point of each surface-containing cell. The Morton code provides a computationally efficient way to implement a BVH by encoding each volume of the BVH as an integer in 3D. At block 512, a binary radix tree is produced using the Morton codes. At block 514, a value is approximated for the implicit surface for SDF samples taken inside and on the boundary of each cell to detect the sign changes. For example, the SDF may be determined by a ray marching algorithm applied to a basis function. The function can be evaluated iteratively as the calculation is carried out moving along a selected direction. A boundary can be set based on an initial assumption regarding how far the shape can possibly extend in order to provide a limit defining how far the calculation can be carried over without intersecting the surface. Eventually, the ray intersects the surface. The function can be evaluated multiple times for each ray. Without the approximation described herein, the evaluation of the function could become very computationally costly with some shapes.

The basis function may be a constant value, a flat surface defined by one of the sides of a bounding volume, or an eigenfunction. An eigenfunction is a function that, when multiplied by a matrix, results in a scalar multiple of the original function. The scalar multiple is called an eigenvalue. The approximation can be carried out once for all the cells/boxes so that a structure can be precomputed before computationally "raying" the surface of the 3D object. Such precomputation can speed up the ray marching algorithm.

Generally, it will be more efficient for smaller bounding volumes to be near the surface of the 3D object; larger bounding volumes contain smaller bounding volumes and all bounding values contain part of the surface. The function can be approximated by a linear combination of basis elements. The more basis elements used for the approximation, the closer the approximation will be to the original shape. The functions included in blocks 508-514 and discussed with respect to FIG. 5 can be used in implementing a step for constructing a bounding volume hierarchy for the shape by assigning bounding volumes to each of the plurality of cells as indicated by the value of the SDF.

At block 516 of FIG. 5, the computing device determines an intersection of a programmatically generated mathematically defined ray with each surface-bounding volume in the BVH. The 3D surface shape is rendered, or a mathematical definition of the shape that is suitable for efficient rendering is stored. A shape for a surface in 3D can be computationally represented discretely, using a mesh of polygons and vertices. For example, triangles are often used, and GPU hardware is typically optimized for triangular meshes. A GPU can build complex shapes from triangular meshes with a high degree of computational efficiency. Process 500 can provide a GPU supported pipeline for decomposing and locally approximating implicit surfaces with computationally efficient and customizable basis functions, managing the tradeoff between error and performance, without any changes to a typical GPU design. In some embodiments, the operations needed to generate a volumetric grid, build bounding volumes, build radix trees, determine ray intersections, and carry out the SDF approximation functions described herein are part of a rendering engine included with the 3D modeling application 102.

Figure 6:
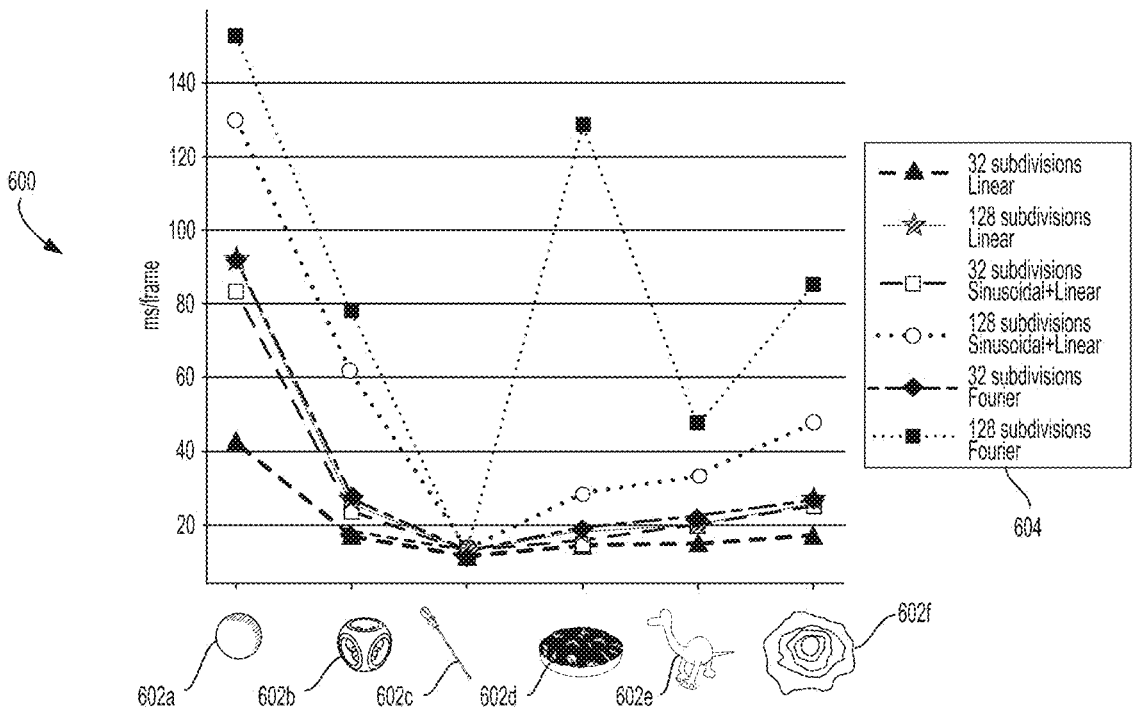
FIG. 6 is a graph showing example rendering times for various approximation bases for modeling shapes using SDF approximation, according to some embodiments.

FIG. 6 is a graph 600 showing example rendering times (ms/frame) for various approximation bases for modeling shapes using SDF approximation, according to some embodiments. The renderings are for shapes 602*a-f*, which are shown below the horizontal axis of the graph. The shapes are ordered left to right from relatively simple to relatively complex. Key 604 can be used as a reference as to what settings for the volumetric grid and for the basis function were used to render the shapes. The number of "subdivisions" refers to the per-axis partition of the initial volumetric grid used. Bounding volumes are always less (depending on the complexity of the surface). In some embodiments, this number also corresponds to the number of leaves in the binary radix tree. Renderings are faster with a less granular volumetric grid. However, as can be observed in FIG. 7, this results in less accuracy of the rendered shape. The differences between rendering times using the various basis functions across the various shapes are also less pronounced with a less granular volumetric grid.

Figure 7:
FIG. 7 is a graph showing example mean-square-error for various approximation bases for modeling shapes using SDF approximation, according to some embodiments.

FIG. 7 is a graph 700 showing example mean-square-error (MSE) for various approximation bases for modeling shapes using SDF approximation, according to some embodiments. The renderings are again for shapes 602a-f, as shown FIG. 6. Key 704 can be used as a reference as to what settings for the volumetric grid (subdivisions) and for the basis function were used to render the shapes. As expected, error is greater with a less granular volumetric grid. The differences between both rendering times and error using the various basis functions are greater for the spherical shape 602a, while both are low for the sphere with open space (602b) and the wand (602c). FIG. 6 and FIG. 7 illustrate the implications of selecting the basis function as well as the implications of the style and complexity of shapes being rendered. The various basis functions will have differences in terms of computational complexity as well. The more complex the shape being modeled, the more differences will exist between the results with the various basis functions, in part because the basis functions themselves and the calculations required for each one can vary in complexity.

Figure 8:
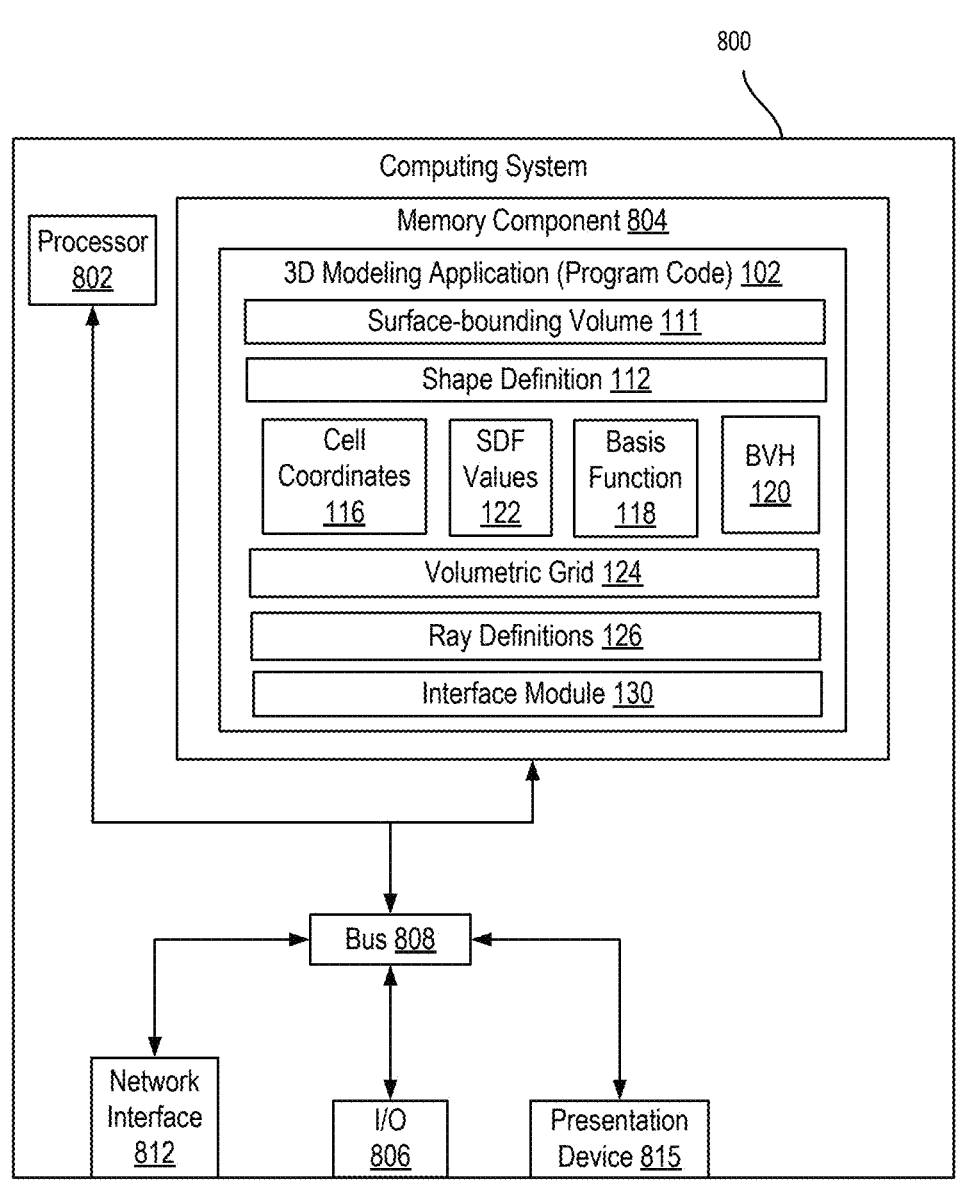
FIG. 8 is a diagram of an example of a computing system that can implement aspects of modeling shapes using SDF approximation, according to certain embodiments.

FIG. 8 depicts a computing system 800 that executes the 3D modeling application 102 with the capability implementing aspects of modeling shapes using SDF approximation, according to certain embodiments. System 800 includes a processing device 802 communicatively coupled to one or more memory components 804. The processing device 802 executes computer-executable program code stored in the memory component 804. Examples of the processing device 802 include a processor, a microprocessor, an application-specific integrated circuit ("ASIC"), a field-programmable gate array ("FPGA"), or any other suitable processing device. The processing device 802 can include any number of processing devices, including a single processing device. The memory component 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read executable instructions. The executable instructions may include processor-specific instructions generated by a compiler or an interpreter from code written in any suitable computer-programming language, including, for example, C, C++, C#, Visual Basic, Java, Python, Perl, and JavaScript.

Still referring to FIG. 8, the computing system 800 may also include a number of external or internal devices, for example, input or output devices. For example, the computing system 800 is shown with one or more input/output ("I/O") interfaces 806. An I/O interface 806 can receive input from input devices such input device 140 and provide output to output devices (not shown), for example, to render 3D shapes and surfaces. One or more buses 808 are also included in the computing system 800. The bus 808 communicatively couples one or more components of a respective one of the computing system 800.

The processing device 802 executes program code (executable instructions) that configures the computing system 800 to perform one or more of the operations described herein. The program code includes, for example, 3D modeling application 102 or other suitable applications that perform one or more operations described herein and/or to cause the processing device 802 to perform the operations. The program code may be resident in the memory component 804 or any suitable computer-readable medium and may be executed by the processing device 802 or any other suitable processing device. Memory component 804, at least during operation of the computing system, includes executable portions of the 3D modeling application or stored data structures for use by the 3D modeling application, for example, bounding volume 111, BVH 120, SDF values 122, and/or interface module 130. Processing device 802 can access portions as needed. Memory component 804 is also used to store shape definition 112, as well as other information or data structures, shown or not shown in FIG. 8.

The system 800 of FIG. 8 also includes a network interface device 812. The network interface device 812 includes any device or group of devices suitable for establishing a wired or wireless data connection to one or more data networks. Non-limiting examples of the network interface device 812 include an Ethernet network adapter, a wireless network adapter, and/or the like. The system 800 is able to communicate with one or more other computing devices (e.g., another computing device executing other software, not shown) via a data network (not shown) using the network interface device 812. Network interface device 812 can also be used to communicate with network or cloud storage used as a repository for shape definition files that can be input to the 3D modeling application 102. Such network or cloud storage can also include updated or archived versions of the 3D modeling application for distribution and installation.

Staying with FIG. 8, in some embodiments, the computing system 800 is also communicatively coupled to the presentation device 815 depicted in FIG. 8. A presentation device 815 can include any device or group of devices suitable for providing visual, auditory, or other suitable sensory output. In examples, presentation device 815 displays rendered 3D shapes and/or surfaces. Non-limiting examples of the presentation device 815 include a touchscreen, a monitor, a separate mobile computing device, etc. In some aspects, the presentation device 815 can include a remote client-computing device that communicates with the computing system 800 using one or more data networks. System 800 may be implemented as a unitary computing device, for example, a notebook or mobile computer. Alternatively, as an example, the various devices included in system 800 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "accessing," "generating," "processing," "computing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device. The methods described herein can also be implemented in a web browser.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   partitioning a bounding volume configured to contain a shape based on sign changes from a signed distance function (SDF) to produce cells around the shape, the cells including surface-containing cells;
   approximating, using a basis function, a value of the SDF for samples taken inside and on a boundary of each surface-containing cell;
   storing, based on the sign changes and the value of the SDF, coordinates for each of the surface-containing cells;
   constructing a bounding volume hierarchy for the shape by assigning bounding volumes to each of the surface-containing cells based on the coordinates;

defining a calculation limit for determining an intersection of a ray produced by a ray marching algorithm with a portion of a surface inside a bounding volume of the bounding volumes;
   precomputing a value for an eigenfunction for each of the bounding volumes to approximate the surface;
   evaluating the basis function using a ray marching algorithm subject to the calculation limit and the approximation of the surface inside the bounding volume to locate the surface of the shape; and
   rendering the shape by traversing the bounding volume hierarchy.

2. The method of claim 1, wherein the coordinates for each of the surface-containing cells in which the surface is present comprise coordinates for an anchor point corresponding to each of the surface-containing cells, the method further comprising:
   producing a binary radix tree using the coordinates of the anchor point; and
   constructing the bounding volume hierarchy for the shape by assigning the bounding volumes to internal nodes of the binary radix tree.

3. The method of claim 1, wherein constructing the bounding volume hierarchy further comprises using fixed depth octree partitioning.

4. The method of claim 1, further comprising:
   accessing a specified resolution value; and
   producing the cells using the specified resolution value.

5. The method of claim 1, wherein the eigenfunction uses each surface-containing cell as an ambient domain.

6. The method of claim 5, wherein the eigenfunction comprises one or more of a Fourier function, a linear function, or a sinusoidal function.

7. A system comprising:
   a memory component including a bounding volume for a shape, wherein the bounding volume is partitioned into cells including surface-containing cells;
   a processing device coupled to the memory component to perform operations comprising:
      approximating, using a basis function, a value of a signed distance function (SDF) for samples taken inside and on a boundary of each surface-containing cell;
      storing, based on a sign changes from the SDF and the value of the SDF, coordinates for each of the surface-containing cells;
      constructing a bounding volume hierarchy for the shape by assigning bounding volumes to each of the surface-containing cells based on the coordinates;
      defining a calculation limit for determining an intersection of a ray produced by a ray marching algorithm with a portion of a surface inside a bounding volume of the bounding volumes;
      precomputing a value for an eigenfunction for each of the bounding volumes to approximate the surface;
      evaluating the basis function using a ray marching algorithm subject to the calculation limit and the approximation of the surface inside the bounding volume to locate the surface of the shape; and
      rendering the shape by traversing the bounding volume hierarchy.

8. The system of claim 7, wherein the coordinates for each of the surface-containing cells comprise coordinates for an anchor point corresponding to each of the surface-containing cells, the operations comprising:
   producing a binary radix tree using the coordinates of the anchor point; and constructing the bounding volume hierarchy for the shape by assigning the bounding volumes to internal nodes of the binary radix tree.

9. The system of claim 8, wherein the operations further comprise:

computing, using the coordinates, a Morton code for each anchor point of the anchor points to produce a plurality of Morton codes; and producing the binary radix tree using the Morton codes.

10. The system of claim 7, wherein the operations further comprise:

accessing a specified resolution value; and producing a volumetric grid using the specified resolution value.

11. The system of claim 7, wherein the eigenfunction uses each surface-containing cell as an ambient domain.

12. The system of claim 11, wherein the eigenfunction further comprises one or more of a Fourier function, a linear function, or a sinusoidal function.

13. A non-transitory computer-readable medium storing executable instructions, which when executed by a processing device, cause the processing device to perform operations comprising:

a step for approximating a value of a signed distance function (SDF) for each cell of a plurality of cells of a bounding volume configured to contain a surface of a shape;

a step for constructing a bounding volume hierarchy for the shape by assigning bounding volumes to each of the plurality of cells as indicated by the value of the SDF;

defining a calculation limit for determining an intersection of a ray produced by a ray marching algorithm with a portion of a surface inside a bounding volume of the bounding volumes;

precomputing a value for an eigenfunction for each of the bounding volumes to approximate the surface;

evaluating a basis function using a ray marching algorithm subject to the calculation limit and the approximation of the surface inside the bounding volume to locate the surface of the shape; and rendering the shape by traversing the bounding volume hierarchy.

14. The non-transitory computer-readable medium of claim 13, wherein the operations further comprise:

defining coordinates for an anchor point corresponding to each of the plurality of cells;

producing a binary radix tree using the coordinates; and constructing the bounding volume hierarchy for the shape by assigning the bounding volumes to internal nodes of the binary radix tree.

15. The non-transitory computer-readable medium of claim 14, wherein the operations further comprise:

computing, using the coordinates, a Morton code for each anchor point of the anchor points to produce a plurality of Morton codes; and producing the binary radix tree using the Morton codes.

16. The non-transitory computer-readable medium of claim 13, wherein the operations further comprise:

accessing a specified resolution value; and producing a volumetric grid using the specified resolution value.

17. The non-transitory computer-readable medium of claim 13, wherein the eigenfunction uses each surface-containing cell as an ambient domain, the eigenfunction further comprising one or more of a Fourier function, a linear function, or a sinusoidal function.

\*    \*    \*    \*    \*